(12) United States Patent
Low et al.

(10) Patent No.: US 11,279,893 B2
(45) Date of Patent: Mar. 22, 2022

(54) METHOD FOR THE HYDROPROCESSING OF RENEWABLE FEEDS

(71) Applicant: Haldor Topsøe A/S, Kgs. Lyngby (DK)

(72) Inventors: Gordon Gongngai Low, Santa Ana, GA (US); Steven W. Stupin, Orange, CA (US)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 16/477,377

(22) PCT Filed: Jan. 26, 2018

(86) PCT No.: PCT/EP2018/051956
§ 371 (c)(1),
(2) Date: Jul. 11, 2019

(87) PCT Pub. No.: WO2018/145923
PCT Pub. Date: Aug. 16, 2018

(65) Prior Publication Data
US 2019/0359901 A1    Nov. 28, 2019

Related U.S. Application Data

(60) Provisional application No. 62/571,882, filed on Oct. 13, 2017, provisional application No. 62/457,432, filed on Feb. 10, 2017.

(51) Int. Cl.
   *C10G 75/00*    (2006.01)
   *C10G 3/00*    (2006.01)

(52) U.S. Cl.
CPC .............. *C10G 75/00* (2013.01); *C10G 3/42* (2013.01); *C10G 2300/1003* (2013.01); *C10G 2300/1011* (2013.01); *C10G 2300/805* (2013.01)

(58) Field of Classification Search
CPC .......... C10G 3/00; C10G 75/00; C10G 75/02; C10G 75/04
See application file for complete search history.

(56) References Cited

U.S. PATENT DOCUMENTS

| 4,414,103 A | 11/1983 | Farrell | |
| 8,440,875 B1 * | 5/2013 | Eizenga | ................... C07C 1/207 |
| | | | 208/263 |
| 2016/0053183 A1 * | 2/2016 | Eizenga | ................... C10G 3/44 |
| | | | 585/253 |

FOREIGN PATENT DOCUMENTS

GB     1 319 619 A     6/1973

OTHER PUBLICATIONS

Patel et al. (Production of renewable diesel through the hydroprocessing of lignocellulosic biomass-derived bio-oil: A review, 2016, Renewable and sustainable energy reviews, vol. 58, pp. 1293-1307). (Year: 2016).*

* cited by examiner

*Primary Examiner* — Youngsul Jeong
(74) *Attorney, Agent, or Firm* — Blank Rome LLP

(57) ABSTRACT

In a method for the hydroprocessing of renewable feeds in a hydroprocessing unit (unit A), comprising the use of sour waste water from the same or another unit (unit B), which is processing feeds containing sulfur and nitrogen, as wash water in unit A, thereby changing the pH of the waste water from unit A to lower the risk of carbonic acid corrosion of corrodible steel parts in unit A, the renewable material in unit A is directed to contact a material that is catalytically active in hydrogenating the renewable material in the presence of hydrogen, and the effluent is combined with the wash water stream which contains hydrogen sulfide and/or ammonia.

8 Claims, No Drawings

METHOD FOR THE HYDROPROCESSING OF RENEWABLE FEEDS

The present invention relates to the hydroprocessing of feeds which may produce $CO_2$ as a by-product, such as when processing renewable feeds. More specifically, sour waste water from one hydroprocessing unit is re-used as wash water for another hydroprocessing unit treating renewable feeds to reduce the risk of carbonic acid corrosion of the carbon steel equipment of that unit.

It is known that a hydroprocessing unit treating renewable feeds may require a certain materials upgrading, sometimes an extensive upgrading, to reduce carbonic acid corrosion of its water-wetted effluent piping and other equipment made of carbon steel (CS) and piping using Duplex stainless steel (SS) or SS overlay. An example of a unit that produces sour water is a hydroprocessing unit that is treating petroleum-based feed stocks. Using the sour waste water—instead of condensate or treated water from the sour water stripper—as wash water reduces the volume of waste water to the water treatment facility.

The idea underlying the present invention is to use sour waste water from units that process feeds containing nitrogen and sulfur as wash water for a hydroprocessing unit processing renewable feeds with the double purpose of (a) reducing the risk of carbonic acid corrosion and (b) increasing the hydrogen sulfide concentration in the recycle gas to aid in keeping the base metal catalysts in the active sulfided state. This way, the use of Duplex or other SS material to protect the equipment against carbonic acid corrosion is not needed.

CA 1,271,124 discloses methanol scrubbing of sour gases, especially $CO_2$ and $H_2S$, from gaseous mixtures, wherein the methanol contains alkaline reacting compounds to counteract corrosion and is regenerated for re-use by expansion, stripping and/or thermal regeneration. $CO_2$ is introduced into the methanol circuit at a location where the methanol is usually free of $CO_2$, e.g. at the bottom of a thermal regeneration column, in order to suppress the formation of sulfide compounds, e.g. $NH_4HS$, capable of decomposing into $H_2S$ upon contact with $CO_2$ at the top of the scrubber.

U.S. Pat. No. 4,250,150 discloses a process for the treatment of gaseous mixtures, which contain sour gases, with organic solvents. The treatment is conducted in the presence of alkaline-reacting compounds in order to prevent any corrosion (caused by the formation of iron pentacarbonyls and sulfur-containing iron carbonyls) of apparatus parts made of iron or normal steel. An aqueous alcoholic solution acts as a physical absorbent. The sour gases referred to are CO and $H_2S$, and the alkaline-reacting compound is $NH_3$ or NaOH.

The present invention relates to a method for the hydroprocessing of renewable feeds in a hydroprocessing unit (unit A), said method comprising the use of sour waste water from the same or another unit (unit B), which is processing feeds containing sulfur and nitrogen, as wash water in unit A, thereby changing the pH of the waste water from unit A to lower the risk of carbonic acid corrosion of corrodible steel parts in unit A, wherein the renewable material in unit A is directed to contact a material that is catalytically active in hydrogenating the renewable material in the presence of hydrogen and the wash water, and the effluent is combined with a water stream which contains hydrogen sulfide and/or ammonia.

WO 98/17743 describes a method and an apparatus for the treatment of fluid catalytic cracking (FCC) product gases. The method de-acidifies the wet gas from the FCC fractionation column before it is compressed for further processing, thereby reducing the volume and the corrosive nature of the gas stream as it is processed. In a preferred process for de-acidification, a gas-liquid contact surface is used to interact the gas stream with an ammonia solution to bind and remove the acid gases from the gas stream before the gas stream enters the main compressor. Specifically, an acid-containing ($CO_2$ and $H_2S$) hydrocarbon stream is de-acidified using an ammonia solution, and a sour water stream is generated and subsequently stripped.

The WO document mentioned above does not disclose the use of sour waste water obtained from a unit which processes feeds containing nitrogen ($NH_3$) and sulfur ($H_2S$) as washing water for a hydroprocessing unit that is treating renewable feeds containing carbonic acid ($CO_2$). Even though the de-acidifying step disclosed in the WO document is similar to that of the present invention, i.e. acid+base→salt+water, the process of the present invention involves the use of sour waste water as an active component in a hydroprocessing unit, whereas in the WO document, the generated sour water stream is just stripped.

In the prior art, sour waste water from hydroprocessing units is typically routed to the sour water stripper for subsequent treatment. According to the method of the present invention, some of the sour waste water will bypass the sour water stripper and be pumped to the wash water surge drum of a hydroprocessing unit treating renewable feeds, with the purpose of being used as wash water.

As a second embodiment of the method according to the invention, chemicals containing nitrogen and/or sulfur, such as ammonia and/or hydrogen sulfide, can be added to the wash water to control the pH thereof.

The ammonia in the waste water from other hydroprocessing units will raise the pH of the waste water from the unit treating renewable feeds. The risk of carbonic acid corrosion of carbon steel is completely eliminated for pH>8.5, but in many cases the risk will be insignificant already at pH>7.5 to 8.

The hydrogen sulfide in the waste water from other hydroprocessing units can also create an iron sulfide (FeS) film that may protect the surface of carbon steel from further corrosion from $CO_2$ and $H_2S$. Even in low concentrations where a sulfide film may not form, some benefit from $CO_2$ corrosion is expected.

Using the method of the present invention, the volume of sour water requiring treatment in the sour water stripper is reduced. The sour wash water can also release some $H_2S$ into the recycle gas to help keeping the recycle gas sour, thus reducing the amount of DMDS (dimethyl disulfide) that may be needed to keep the catalyst sulfided.

In the method of the invention, the pH of the waste water from unit A is preferably raised to a value of 7.0 or above. More preferably, the pH of the waste water from unit A is raised to a value of 8.0 or above, whereby the risk of carbonic acid corrosion of corrodible steel parts is eliminated.

The unit that produces sour water (unit B) is preferably a hydroprocessing unit that is treating petroleum-based feed stocks.

The invention claimed is:
1. A method for the hydroprocessing of renewable feeds in a hydroprocessing unit (unit A), said method comprising:
   using sour waste water from another unit (unit B), which is processing feeds containing sulfur and nitrogen, as wash water in the unit A, thereby changing a pH of waste water from the unit A to lower the risk of carbonic acid corrosion of corrodible steel parts in the unit A, wherein the renewable feeds in the unit A is directed to contact a material that is catalytically active in hydrogenating the renewable feeds in the presence of hydrogen and the wash water, and an effluent from the unit A is combined with the wash water, which contains hydrogen sulfide and ammonia, and wherein the unit B, which is processing feeds containing sulfur and nitrogen and produces the sour waste water, is a hydroprocessing unit treating petroleum-based feeds.

2. The method according to claim 1, wherein chemicals containing nitrogen and/or sulfur are injected into the wash water to control the pH thereof.

3. The method according to claim 2, wherein ammonia is injected into the wash water.

4. The method according to claim 1, wherein the pH of the waste water from the unit A is raised to a value of 7.0 or above.

5. The method according to claim 4, wherein the pH of the waste water from the unit A is raised to a value of 8.0 or above.

6. The method according to claim 1, wherein the sour waste water contains more than 100 ppm hydrogen sulfide.

7. The method according to claim 1, wherein the sour waste water contains more than 100 ppm ammonia.

8. The method according to claim 1, wherein the wash water which contains hydrogen sulfide and ammonia creates an iron sulfide film capable of protecting the surface of carbon steel in at least one of the hydroprocessing units.

\* \* \* \* \*